(12) United States Patent
Droesbeke et al.

(10) Patent No.: US 10,135,181 B2
(45) Date of Patent: Nov. 20, 2018

(54) CABLE CONNECTOR

(71) Applicant: Amphenol FCI Asia Pte. Ltd., Singapore (SG)

(72) Inventors: Gert Droesbeke, Chartres (FR); Aymeric Soudy, Besancon (FR)

(73) Assignee: Amphenol FCI Asia Pte. Ltd., Singapore (SG)

( * ) Notice: Subject to any disclaimer, the term of this patent is extended or adjusted under 35 U.S.C. 154(b) by 0 days.

(21) Appl. No.: 14/895,953

(22) PCT Filed: Jun. 7, 2013

(86) PCT No.: PCT/IB2013/001341
§ 371 (c)(1),
(2) Date: Dec. 4, 2015

(87) PCT Pub. No.: WO2014/195750
PCT Pub. Date: Dec. 11, 2014

(65) Prior Publication Data
US 2016/0118745 A1  Apr. 28, 2016

(51) Int. Cl.
*G02B 6/38* (2006.01)
*H01R 13/627* (2006.01)
*H01R 13/436* (2006.01)
*H01R 13/506* (2006.01)
(Continued)

(52) U.S. Cl.
CPC ......... *H01R 13/6271* (2013.01); *G02B 6/389* (2013.01); *G02B 6/3817* (2013.01); *G02B 6/3821* (2013.01); *G02B 6/3865* (2013.01); *H01R 13/05* (2013.01); *H01R 13/4368* (2013.01); *H01R 13/506* (2013.01); *H01R 13/6272* (2013.01); *H01R 13/639* (2013.01); *H01R 2201/26* (2013.01)

(58) Field of Classification Search
None
See application file for complete search history.

(56) References Cited

U.S. PATENT DOCUMENTS

| 4,898,548 A | 2/1990 | Case et al. ............... 439/686 |
| 4,998,884 A * | 3/1991 | Ishikawa ............ H01R 13/629 |
| | | 439/358 |
| 5,154,629 A | 10/1992 | Carver et al. ............ 439/352 |

(Continued)

FOREIGN PATENT DOCUMENTS

| CN | 101615736 A | 12/2009 |
| CN | 101682139 A | 3/2010 |

(Continued)

OTHER PUBLICATIONS

European Office Action from European Application No. 13739495.3 dated Oct. 7, 2016.

(Continued)

*Primary Examiner* — Chad H Smith
(74) *Attorney, Agent, or Firm* — Wolf, Greenfield & Sacks, P.C.

(57) ABSTRACT

A connector including a latch hingeable about a hinging section. The latch has a latch end at one side of the hinging section and a rear end at the opposite side of the hinging section. The connector includes one or more resilient spring elements engaging the rear end to bias the latch end to a latching position.

19 Claims, 11 Drawing Sheets

Figure 1A:
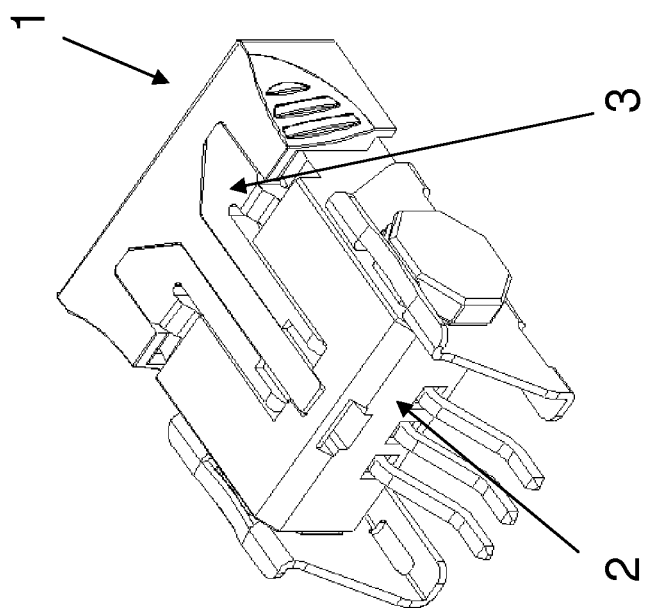

(51) Int. Cl.
*H01R 13/05* (2006.01)
*H01R 13/639* (2006.01)

(56) References Cited

U.S. PATENT DOCUMENTS

| | | | | | |
|---|---|---|---|---|---|
| 5,775,931 | A | * | 7/1998 | Jones | H01R 13/631 |
| | | | | | 439/358 |
| 6,045,388 | A | * | 4/2000 | Higgins | H01R 13/641 |
| | | | | | 439/352 |
| 6,056,578 | A | * | 5/2000 | Lin | H01R 13/514 |
| | | | | | 439/358 |
| 6,186,819 | B1 | * | 2/2001 | Holub | H01R 13/6275 |
| | | | | | 439/358 |
| 6,234,828 | B1 | * | 5/2001 | Kuo | H01R 13/6275 |
| | | | | | 439/358 |
| 6,679,719 | B2 | * | 1/2004 | Endo | H01R 13/641 |
| | | | | | 439/352 |
| 2010/0062635 | A1 | | 3/2010 | Jones, Jr. et al. | |
| 2013/0072054 | A1 | | 3/2013 | Hotea et al. | 439/460 |

FOREIGN PATENT DOCUMENTS

| | | |
|---|---|---|
| CN | 102934291 A | 2/2013 |
| EP | 1 460 527 A2 | 9/2004 |
| WO | WO 2008/102544 A1 | 8/2008 |

OTHER PUBLICATIONS

EP 13739495.3, Oct. 4, 2016, Office Action.
Chinese Office Action for Chinese Application No. 201380077174.1 dated May 4, 2017.
CN 201380077174.1, May 4, 2017, Office Action.

\* cited by examiner

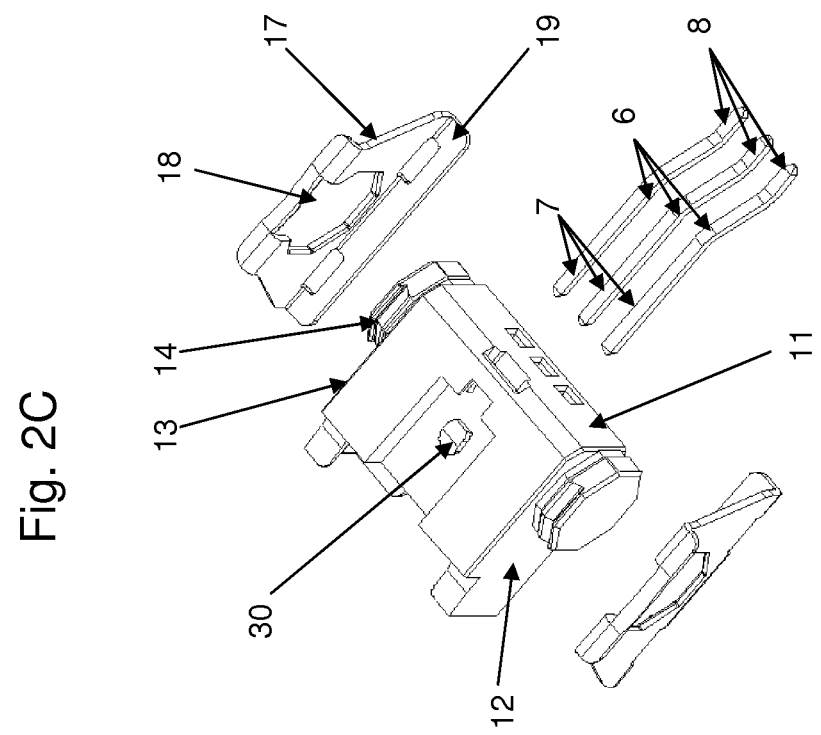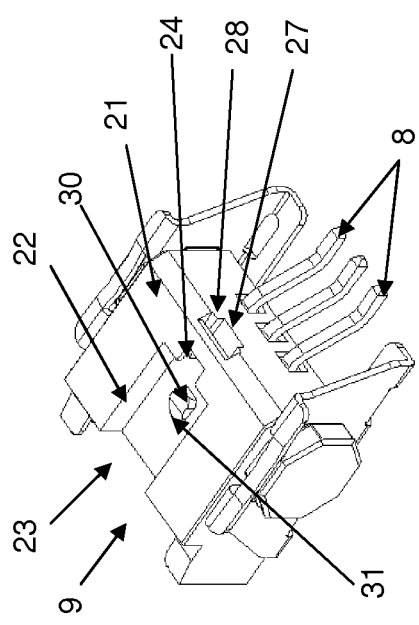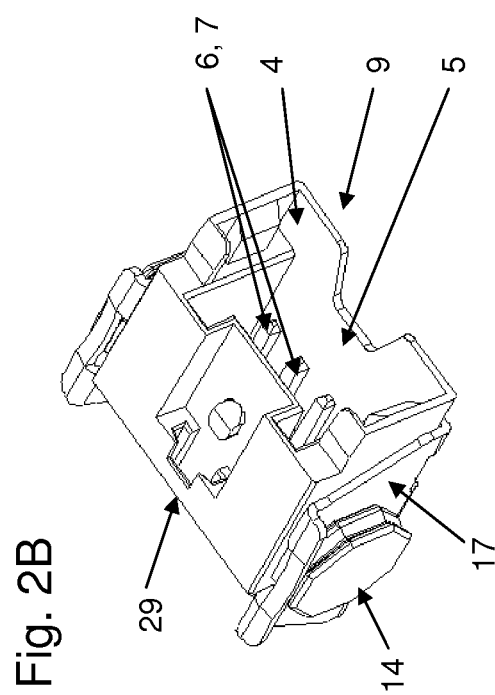

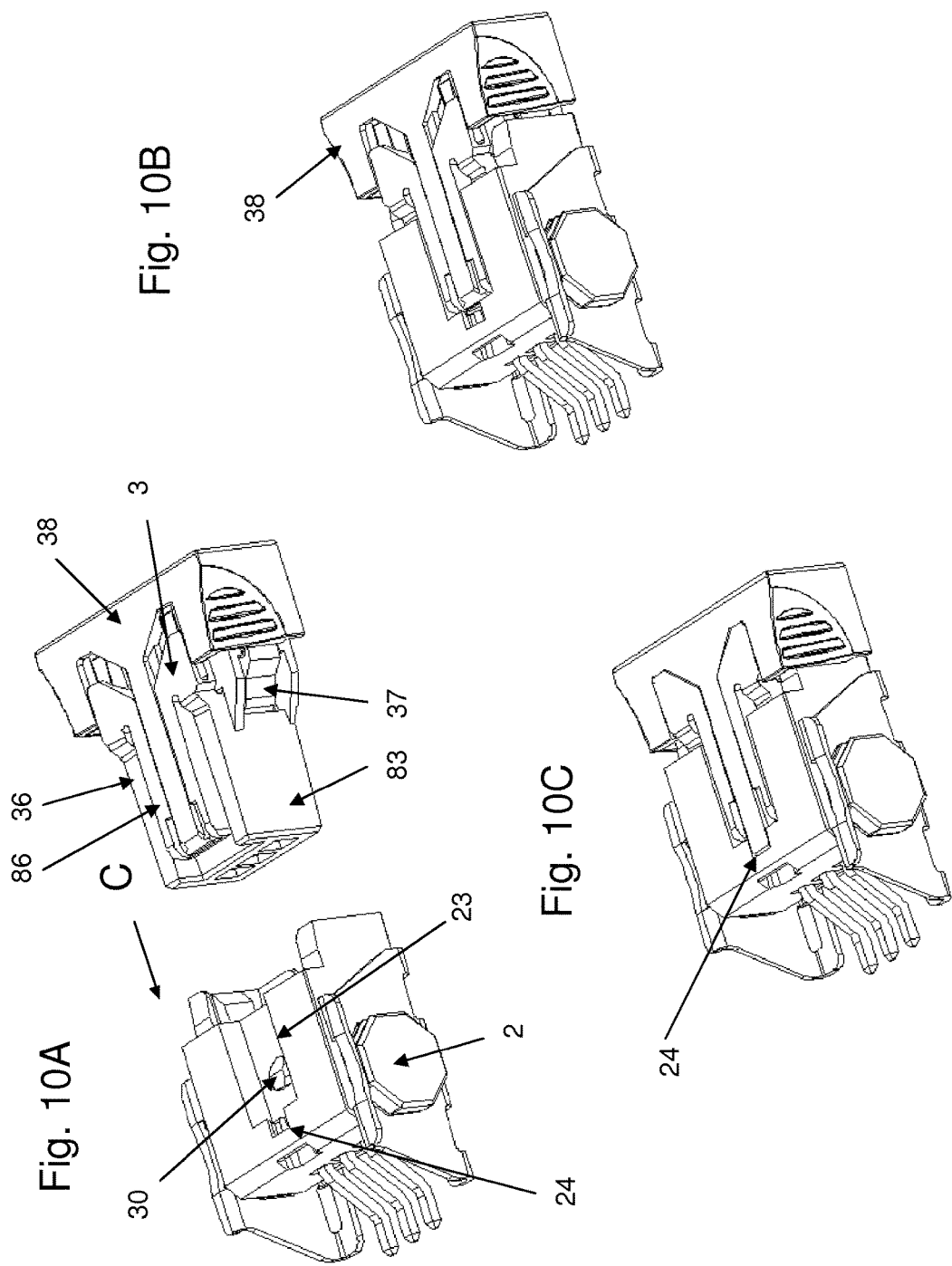

CABLE CONNECTOR

The invention relates to a connector comprising a latch for locking connection to a complementary connector. The latch serves to secure coupling of the connector with the complementary connector to prevent unintentional disengagement. The connector can for instance be an optical or electrical cable connector.

While miniaturization of connectors is pursued in may applications, latch mechanisms generally consume space. If a latch is too frail, the latching may not be sufficiently reliable.

It is an object of the invention to provide a connector allowing to combine reduced space consumption with more reliable latching.

The object of the invention is achieved with a connector comprising a latch hingeable about a hinging section, the latch having a latch end at one side of the hinging section and a rear end at the opposite side of the hinging section. The connector comprises one or more resilient spring elements engaging the rear end to bias the latch end to a latching position. In such case, the latching force exerted by the latch is not only derived from the elastic properties of the latch material and the dimensions of the latch construction, but is also increased by the spring elements. This makes it possible to obtain a reliable latch connection with a latch consuming little space.

The hinging section can be a static hinging axis, although typically with moulded flexible latches the hinging axis may move during hinging, resulting in a hinging area rather than a fixed linear axis of rotation.

In a specific embodiment, the spring elements include one or more resilient lips, e.g., with free tips engaging the rear end of the latch. The lips can for example point in a direction opposite to a mating direction, to push the rear end of the latch at larger distance from the hinging axis.

In a specific embodiment, the spring elements can be part of an insert in a matching cavity of the connector. The connector may for instance comprise a receiving opening allowing insertion of such an insert into the cavity, the rear end of the latch and the resilient lips pointing in the direction of the receiving opening. To allow easy insertion of the insert into the matching cavity, the connector may comprise recesses extending from the receiving opening towards the hinging axis, the resilient lips protruding through the recesses to engage the rear end of the latch. This makes it possible to arrange the resilient lips in such a way that the insert can be positioned into the cavity in only one single orientation.

The insert can for example be a clip with cavities holding electroconductive contacts connected to a cable. The contacts can for example be pin receiving terminal contacts, the connector comprising a contact face with one or more openings allowing access to the terminal contacts by matching pin contacts. Optionally, the cavities holding the terminal contacts can be configured to facilitate lateral insertion of the terminal contacts. The terminal contacts can be clipped into the clip, and subsequently, the clip can be inserted into the receiving cavity, securing the terminal contacts in the respective cavities of the clip. Optionally, the clip comprises cavities accessible for lateral insertion of a terminal contact from a first side of the clip and cavities accessible for lateral insertion of a terminal contact from an opposite side of the clip.

The latch can for example be part of the connector housing, such as an in-molded integral part of the connector housing, which may for instance be resiliently biased into its latching position. Alternatively, the latch can be a separate part hingeably connected to the housing by a hinge, also formed as a separate part.

The invention also pertains to a connector housing for a connector as disclosed, and to a connector assembly of a connector as disclosed, and a complementary connector comprising a latch section engaging the latch end of the latch.

The disclosed connectors are particularly useful for use in the automotive field, e.g., for connecting LED lamps to a PCB controlling and powering the LED lamps.

The invention will be further explained under reference to the accompanying drawings.

Figure 1B:
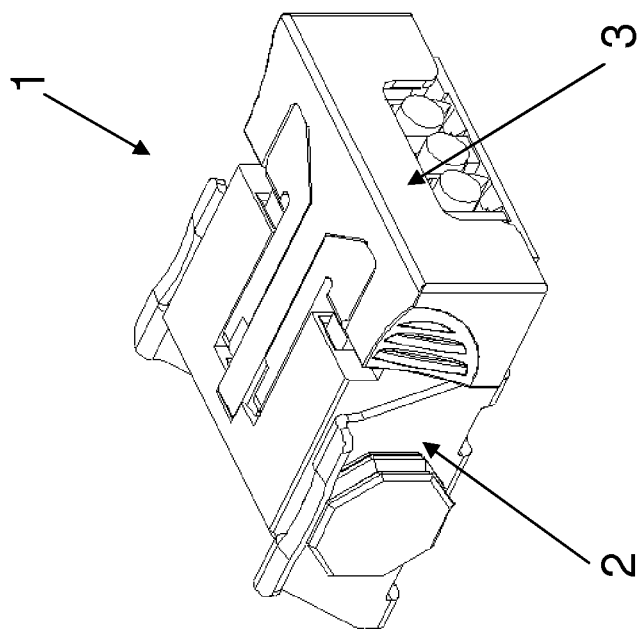
Figure 3C:
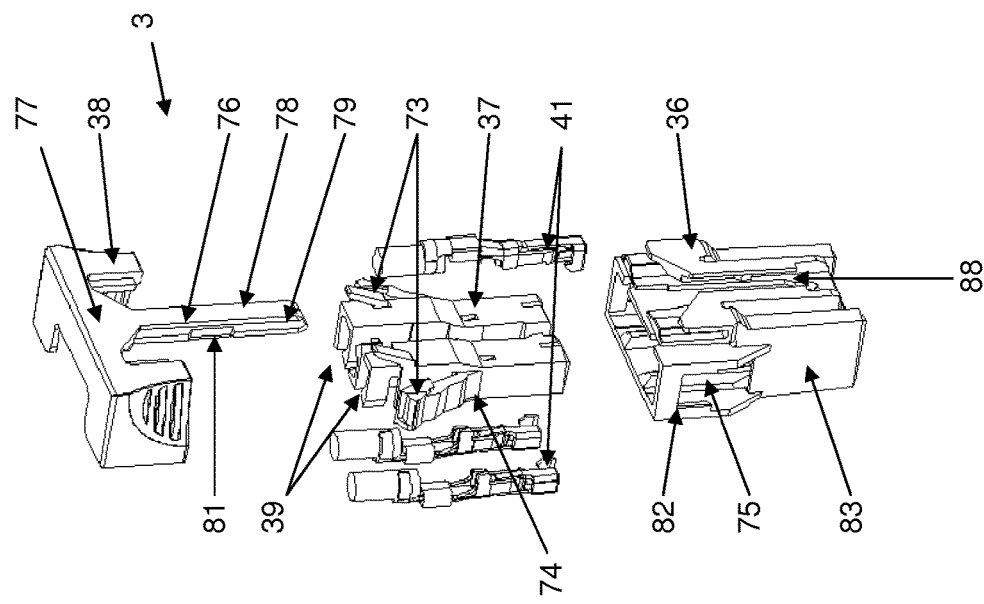
Figure 3A:
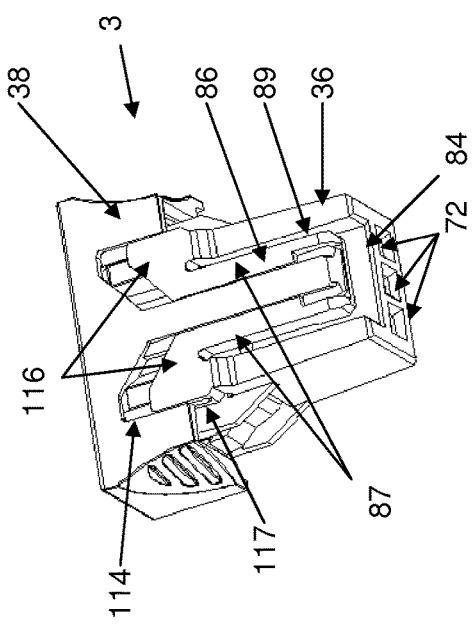
Figure 3B:
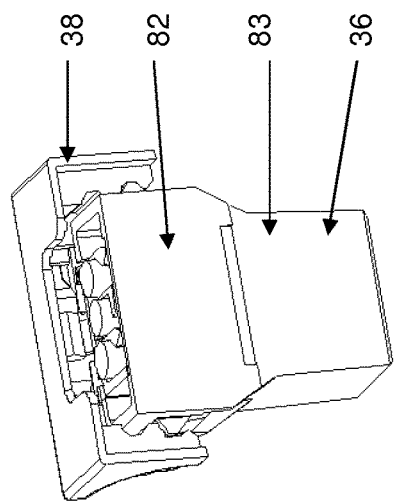
Figure 4:
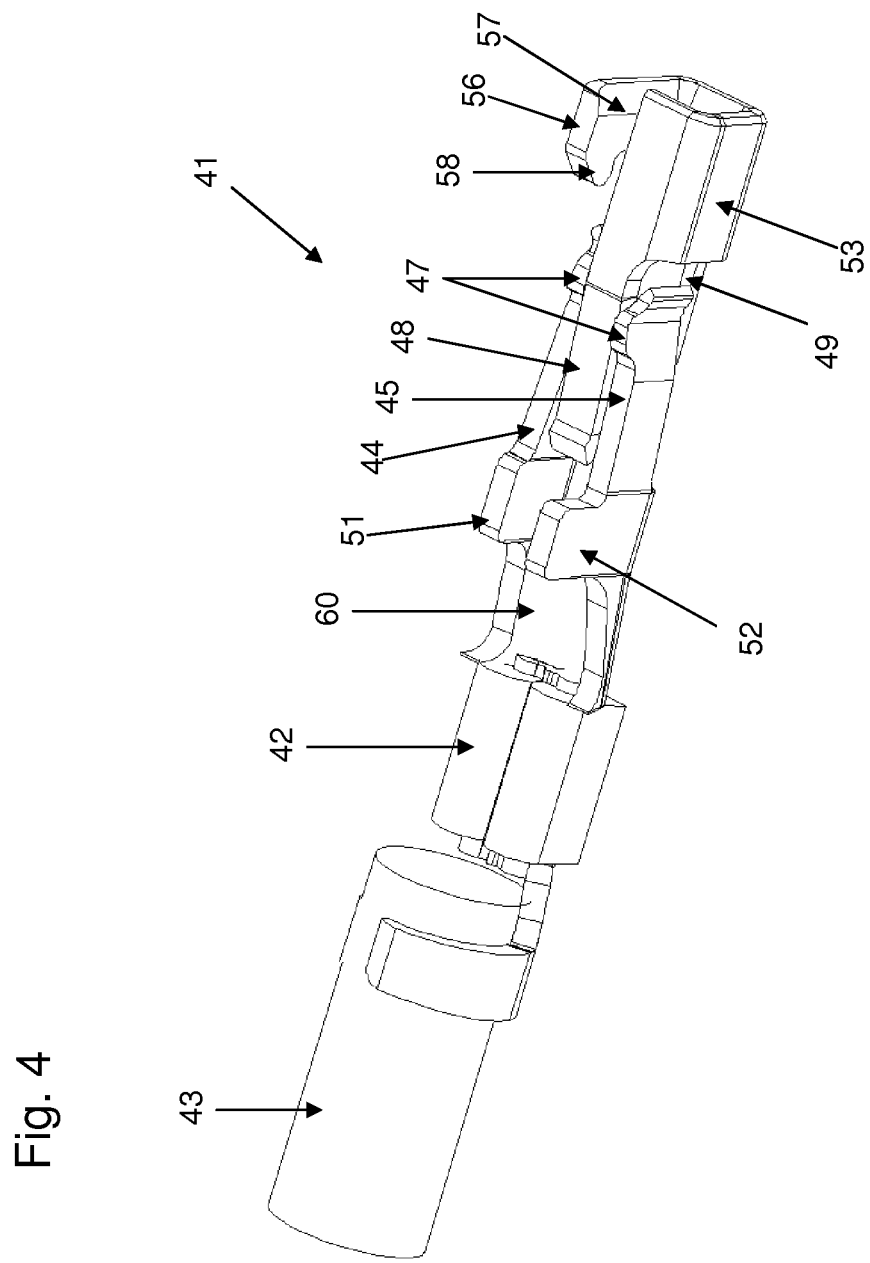
Figure 6:
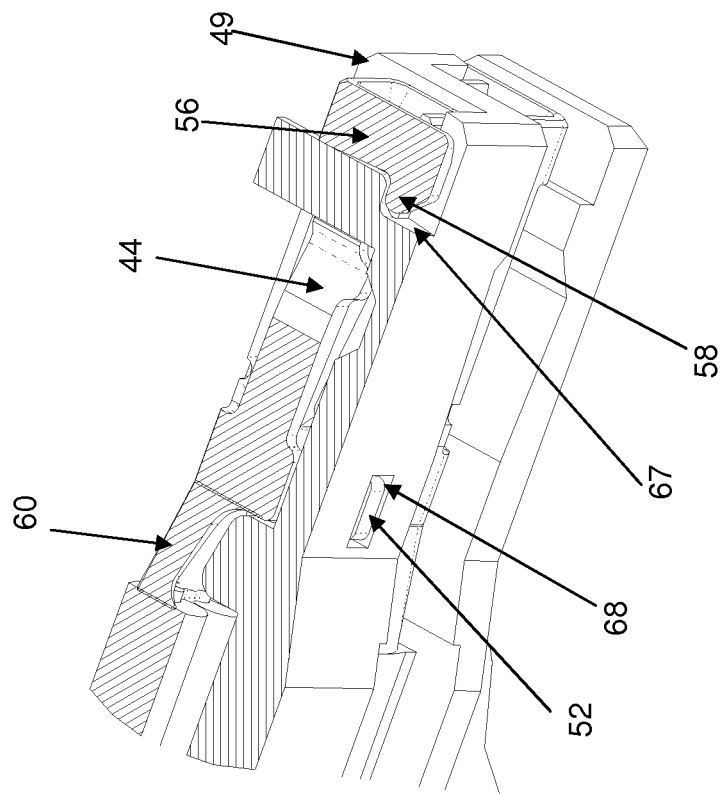
Figure 5:
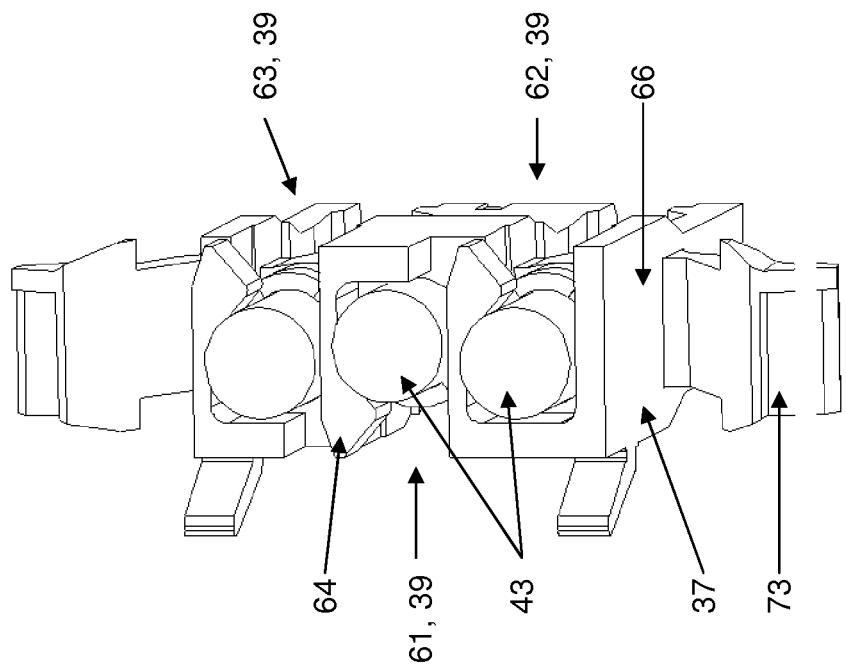
Figure 8:
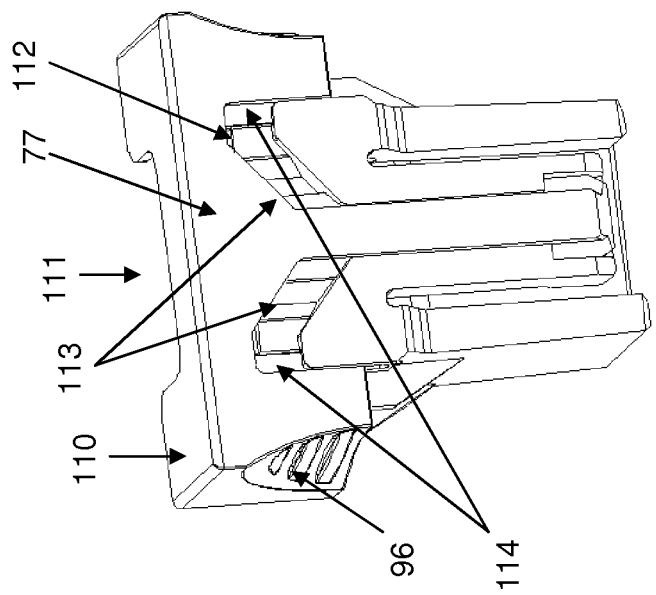
Figure 7:
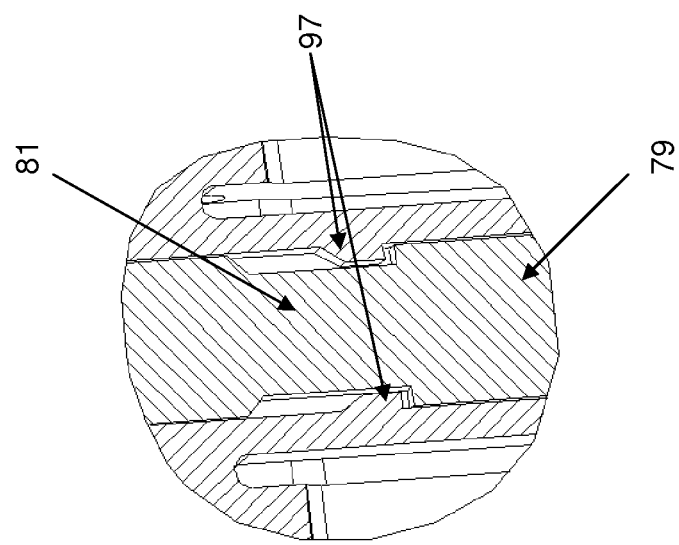
Figure 12:
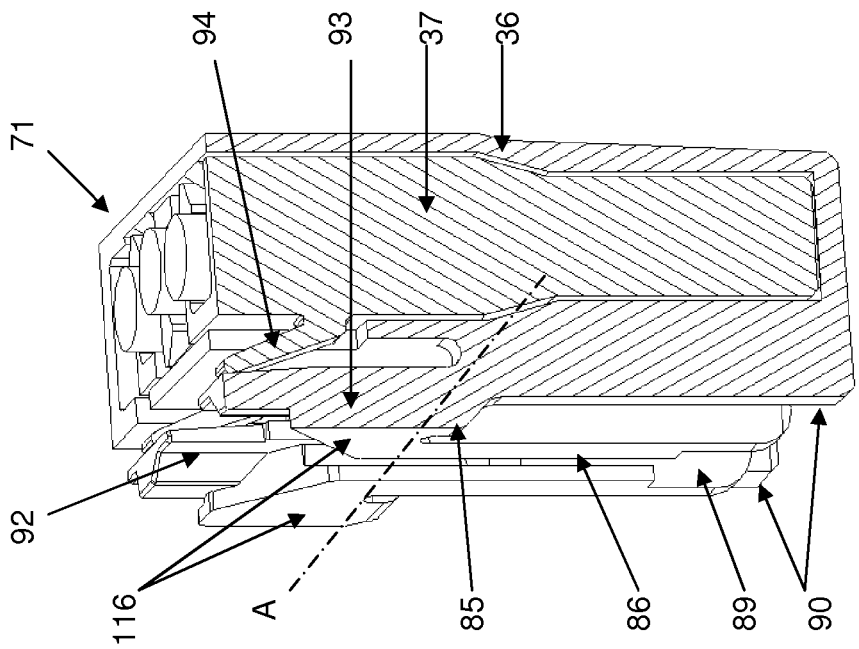
Figure 11:
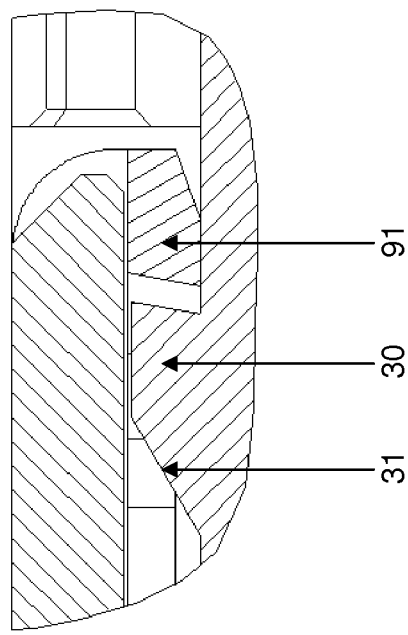
Figure 13:
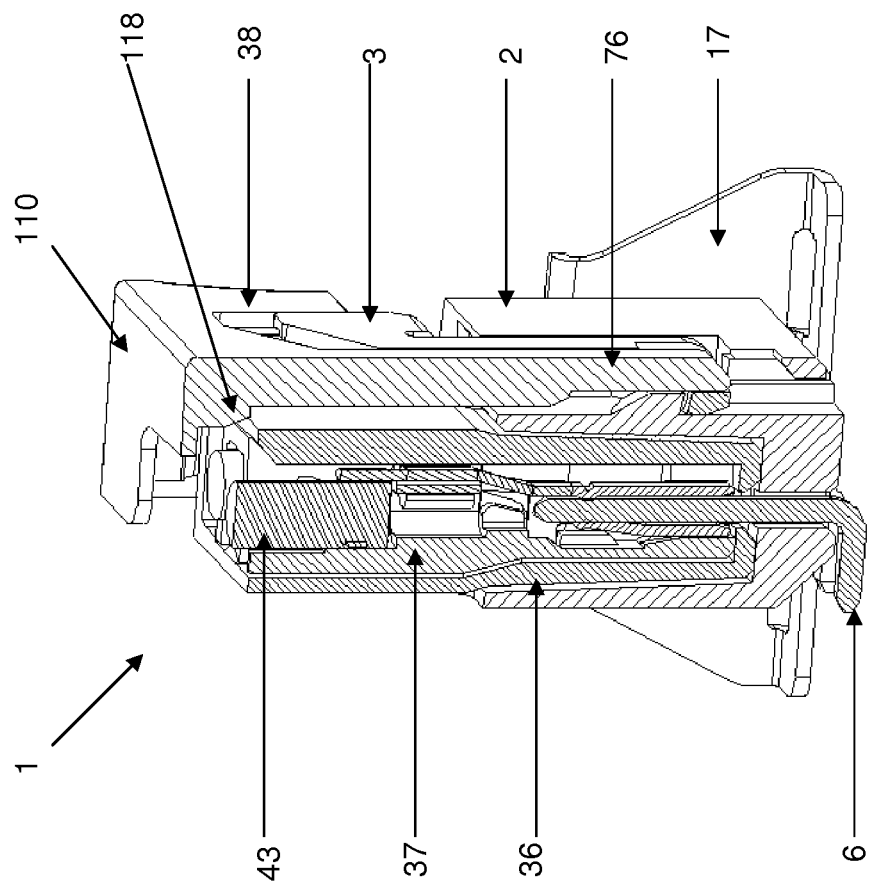
Figure 15:
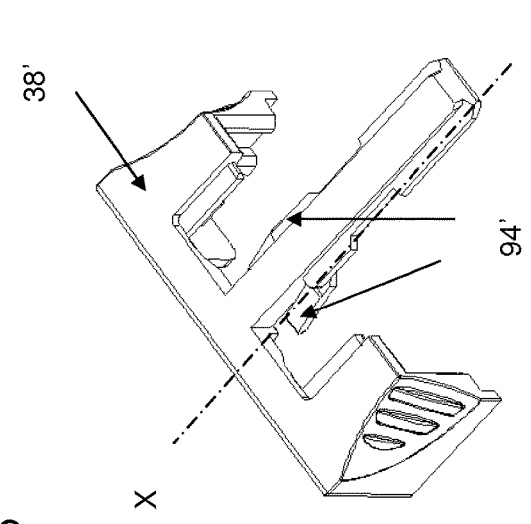
Figure 14:
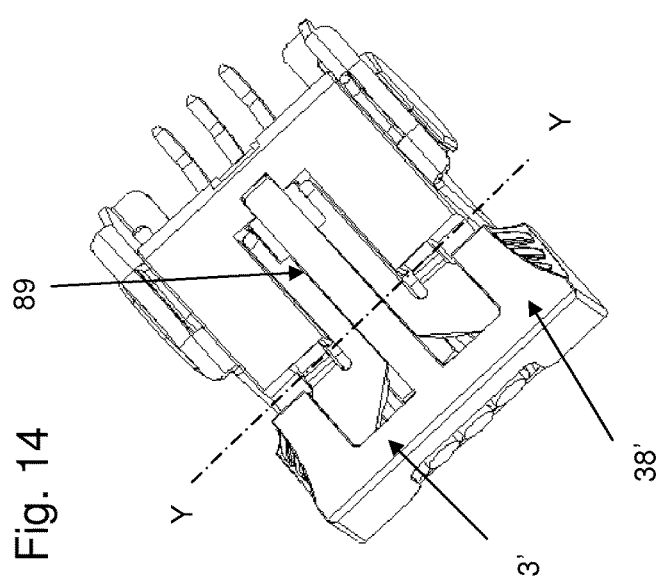
Figure 16:
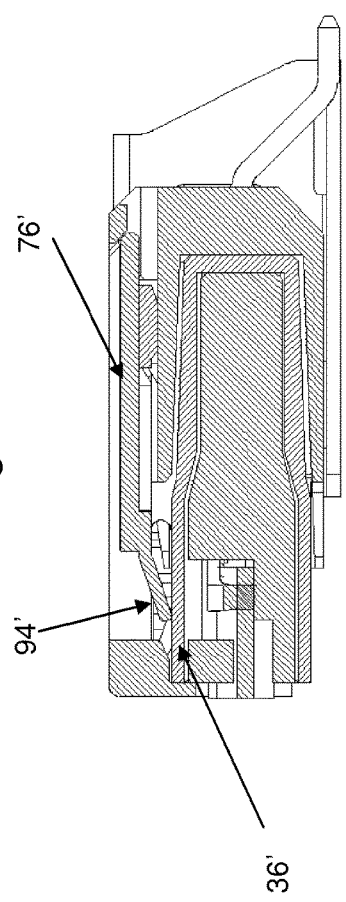

FIG. 1A: shows an exemplary embodiment of an assembly with a cable connector and a complementary pin header connector;

FIG. 1B: shows the assembly of FIG. 1A from a different view point;

FIG. 2A: shows the pin header connector of FIG. 1A;

FIG. 2B: shows the connector of FIG. 2A from a different view point;

FIG. 2C: shows the connector of FIG. 2A in exploded view;

FIG. 3A: shows the cable connector of FIG. 1A;

FIG. 3B: shows the connector of FIG. 3A from a different view point;

FIG. 3C: shows the connector of FIG. 3A in exploded view;

FIG. 4: shows a terminal contact of the cable connector of FIG. 3A;

FIG. 5: shows a detail of the cable connector of FIG. 3A;

FIG. 6: shows in detail two terminal contacts positioned in the cable connector of FIG. 3A;

FIG. 7: shows a detail of the cable connector of FIG. 3A;

FIG. 8: shows a housing with a slider lock of the cable connector of FIG. 3A;

FIGS. 9A-E: shows in cross section consecutive assembly steps of the cable connector of FIG. 2A;

FIGS. 10A-C: shows consecutive assembly steps of the assembly of FIG. 1A;

FIG. 11: shows in cross section a detail of the cable connector of FIG. 3A;

FIG. 12: shows in detail the inner side of the cable connector of FIG. 3A;

FIG. 13: shows the connector assembly of FIG. 1 in cross section;

FIG. 14: shows an alternative embodiment of a connector;

FIG. 15: shows a slider lock of the connector of FIG. 14;

FIG. 16: shows the connector of FIG. 14 in cross section.

FIGS. 1A and 1B show two perspective views of an assembly 1 of an on-board pin header connector 2 on a printed circuit board (not shown) and a complementary cable connector 3.

The pin header connector 2 is shown separately in FIGS. 2A-C and comprises a hollow housing 4 and a plurality of parallel contact pins 6. Each contact pin 6 has one end 7 extending inside the cavity 5 of the housing (FIG. 2B), while its other end 8 extends outside the housing 4 (FIG. 2A) for connection to a printed circuit board (not shown).

The housing has an open front side 9 (see FIG. 2B), a closed back side 11 (see FIG. 2A) and two side faces 12, 13 provided with an octagonal projection 14. A hold down member 17 with an octagonal opening 18 fits over the octagonal projection 14 and comprises a lower flange 19 for connection to the printed circuit board. Due to the octagonal fit, the two hold down members 17 can fixate the pin header connector 2 in a horizontal position (see FIGS. 2A and 2B), a 45 degrees position or a vertical position (see FIG. 13).

The top side 21 of the housing 4 of the pin header connector 2 is provided with a recess 22 extending parallel to the longitudinal direction of the pins 6. A first section 23 of the recess 22 extends from the open side 9 of the housing 4 and has a rectangular cross sectional shape. A second section 24 of the recess 22 extends between the first section 23 and the closed back side 11 of the housing 4. At the second section 24 the width of the recess 22 is less than at the first section 23. Two oppositely directed flanges 26 narrow the open side of the recess 22 at the second section 24. At the second section 24 the recess has a narrower lower part 27 and a wider upper part 28. At the end face 11, the recess 22 is bridged by a strip 29.

Centred in the first section 23 of the recess 22 is a projection 30 with a height which is less than the depth of the recess 22 and with a front side 31 slanting down in the direction of the open side 9 of the housing 4. In the shown embodiment, the top side of the projection 30 is flat. In an alternative embodiment the top face may slant down in the direction of the strip 29, as will be explained here after.

FIGS. 3A-C show the cable connector 3, which comprises a housing 36, an inner clip 37 and a slider lock 38. As shown in FIG. 3C, the clip 37 comprises parallel slots 39 for receiving terminal contacts 41 extending between a cable entry side of the clip 37 and a pin receiving side of the clip 37.

A separate terminal contact 41 is shown in more detail in FIG. 4. Each terminal contact 41 has one end with a cable crimp connection 42 crimped to a cable end 43. The terminal contacts 41 comprise two parallel resilient contact beams 44, 45 with tips 47 forced apart by an oppositely directed third resilient contact beam 48. The third beam 48 preloads the two parallel contact beams 44, 45 resulting in a firm contact pressure with an inserted contact pin 6 of a complementary pin header connector 2.

A backbone 49 facing the third contact beam 48 is connected to the two parallel contact beams 44, 45 by two oppositely arranged flanges 51, 52 at either side of the backbone 49. The end of the backbone 49 is connected to the third contact beam 48 by a third flange 53. The flanges 51, 52, 53 and the contact beams 44, 45 are substantially under right angles with the backbone 49. The third contact beam 48 is parallel to the backbone 49.

A pin receiving opening 54 of the terminal contact 41 is confined by:
 the third contact beam 48;
 the third flange 53 bridging the third contact beam 48 and the backbone 49;
 the backbone 49; and
 a fourth flange 56 opposite to the third flange 53.

A gap 57 remains between the fourth flange 56 and the third contact beam 48. The gap 57 provides additional flexibility to the backbone 49. The fourth flange 56 protrudes above an upper face of the third contact beam 48 and is provided with a hook 58 pointing in the direction of the cable crimp connection 42. The flexibility of the backbone 49 facilitates self-locking of the hook 58 into a corresponding retention slot.

The flange 52 that is in line with the third flange 53 protrudes above an upper face of the third contact beam 48 to form a key flange or flag.

The contact beam 45 in line with the third flange 53 is somewhat shorter than the contact beam 44 in line with the hooked fourth flange. As a result the three contact beams 44, 45, 48 provide staggered contact points to contact an inserted pin 6 of the pin header connector 2.

The terminal contacts 41 have a sloping middle section 60 connecting the side of the pin receiving opening 54 with the side of the crimp connection 42 (see also FIG. 6). The sloping section 60 offsets the pin receiving opening 54 from the crimp connection 42 to prevent direct contact between an inserted contact pin of a mating header connector with the crimp connection 42.

The terminal contacts 41 are clipped into the longitudinal slots 39 of the clip 37. The slots 39 are profiled to match the shape of the terminal contacts 41 to receive these in only one single possible position. The terminal contacts 41 fit into the slots 39 with a clearance fit to keep the contacts 41 floating within the assembled cable connector 3. This floating helps to reduce vibration sensitivity.

In the exemplary embodiment shown in the drawings, see, e.g., FIG. 5, the slots 39 of the clip 37 include a middle slot 61 accessible from one side of the clip 37, and two slots 62, 63 flanking the middle slot 61, which are accessible from an opposite side of the clip 37. At the cable entry side, the slots 39 are provided with flexible snap-fit hooks 64 snapping around the cable ends 43. A first slot 62 is formed between a hook 64 and a side wall 66 of the clip 37. The middle slot 61 and the third slot 63 are formed between two adjacent hooks 64 pointing in opposite directions.

During assembly, the first terminal contact 41 is clipped into the first slot 62. Subsequently, a second terminal contact 41 is clipped into the middle slot 61, thereby locking the first slot 62 with the first terminal contact 41. Similarly, the second terminal contact 41 is locked by clipping the third terminal contact 41 into the third slot 63.

The pin receiving side of the clip 37 is provided with a first retention slot 67 receiving the hook 58 of the respective terminal contact 41 (see FIG. 6). The gap 57 provides additional flexibility to the backbone 49 so the hook 58 can snap easier into the retention slot 67 during assembly, while the contact beams 44, 45 remain pre-loaded.

Similarly, also the projecting key flange 52 in line with the third flange 53 is received in a matching second retention slot 68 within the slot 39 receiving the terminal contact 39. The retention slots 67, 68 can be dimensioned in such a way that a tensile force exerted via the cable end will first stress the key flange 52 in the second retention slot 68. The hooked third flange 56 in the first retention slot 67 mainly serves as a back-up lock. However, if the tensile force slightly deforms the retention slot 68 holding key flange 52, it will also pull the hooked third flange 56 in the first retention slot 67. This provides an additional reaction force, by which the total reaction force is increased. This helps to reduce stresses at the area of the contact beams 44, 45.

After the terminal contacts 41 are clipped into the respective slots 39, the clip 37 can be pushed into the housing 36, as shown in FIG. 12. The housing 36 is formed as a symmetrical sleeve with a rectangular outline in cross section having an open cable entry side 71 and a pin entry side with a row of openings 72 (FIG. 3A). After assembly each opening 72 exposes a pin receiving opening 54 of an associated terminal contact 41.

The side faces of the clip 37 are provided with resilient flaps 73. The side edge 74 of the flap 73 directed to the pin entry side 72 is connected to the rest of the clip 37. Side faces of the housing 36 are provided with openings 75 receiving the resilient flaps 73 when the clip 37 is slid into the housing 36.

The slider lock 38 has a T-shaped body with a slider strip 76 centrally extending from a top edge 77 near the cable entry side 71 into the direction of the pin receiving side 72. The slider strip 76 has a narrow front part 78 symmetrically topping a wider backbone 79. The wider backbone 79 shows a narrowed section 81 about halfway its length (see FIGS. 3C and 7). The top edge 77 is flanged with a top flange 110 partly covering the cable entry side of the housing 36 and having a recess 111 defining a passage opening for the connected cables 43. The outer ends of the top edge 77 and the outer ends of the top flange 110 are connected by downwardly extending ears 96. The ears 96 have profiled surfaces to provide a better grip. The ears 96, the top flange 110 and the top edge 77 are orthogonal relative to each other. The top edge 77 has two symmetrically arranged recesses 112 at both sides of the slider strip 76. Both recesses 112 have a bevel top side 113, thus providing a broadening section of the slider strip 76 at the top edge 77. At the side opposite to the slider strip 76 both recesses 112 are provided with a slider rib 114 in the same plane as the backbone 79 of the slider strip 76.

The housing 36 has a wider upper part 82 at the cable entry side and a narrower lower part 83 at the pin receiving side (see FIG. 3B). A front side of the housing 36 comprises a recess 84 over the length of the narrower part 83 (see FIG. 3A). A U-shaped latch 86 with two parallel legs 87 extends above the recess 84. The legs 87 of the U-shaped latch 86 define a recess 89 for receiving the slider strip 76 and are provided with facing open sides or slits 88 for tightly receiving edges of the backbone 79 of the slider strip 76 in a sliding manner. This way the slider strip 76 and the U-shaped latch 86 have matching stepped cross sections. Alternatively, a dovetail cross section can be used, allowing to use a thinner slider strip 76 and a thinner U-shaped latch 86, so less space will be consumed by the connector assembly 1.

To minimize space consumption, the slider lock 38 and the latch 87 are flush with the outer surface of the pin header connector 2.

The top ends of the legs 87 are connected to flaps 116 shaped to fit within the recesses 112 in the top edge 77 of the slider lock 38. The slider ribs 114 of the slider lock top edge 77 are received in corresponding slits 117 at a side of the flap opposite to the side that lays against the slide strip 76. The slider ribs 114 in the slits 117 and the backbone 79 received in the slits 88 join the slider lock 38 and the outer housing 36 in such a way the slider lock 38 acts as an extended lever of the U-shaped latch 86.

In FIG. 12 the clip 37 and the housing 36 are shown without the slider lock 38 and with one side wall of the housing 36 broken away. A bridge 85 connects the flaps 116 to the side walls 90 of the recess 84. The legs 87 of the U-shaped latch 86 have a lower wall 92 extending to the cable entry side of the housing 36. This lower wall 92 and the flaps 116 are connected to the bridge 85 by a side wall 93. The lower walls 92, the side walls 93 and the bridge 85 form a first sliding guide for guiding the slider lock 38 into the desired position. A second sliding guide is formed by the slider ribs 114 received in the slits 117. The clip 37 is provided with resilient lips 94 pushing against the top ends of the lower walls 92 of the U-shaped latch 86 to bias the U-shaped latch 86 into a downwardly tilted position.

At the opposite end of the U-shaped latch 86 the lower walls 92 of the two legs 87 are connected by a bridge 91. The bridge 91 is configured to snap over the projection 30 in the recess on top of the pin header connector housing 2 (see FIG. 2A), as will be explained hereinafter. The resilient lips 94 of the clip 37 bias the bridge 91 to snap over the projection 30.

During assembly the base part 79 of the slider strip 76 is received in the oppositely arranged open slits 88 in the legs 87 of the U-shaped latch 86. This is shown in FIG. 7, which shows the slider strip 76 inside the slits 88 with the top wall bordering the slits 88 being broken away. About halfway their length the slits 88 are locally narrowed by two oppositely arranged cams 97, dimensioned to slide along the narrowed section 81 at the outer edge of the slider strip 76. When the slider strip 76 of the slider lock 38 is introduced into the slits 88, it will first abut gradually sloping edges of the two oppositely arranged cams 97. The U-shaped latch 86 is dimensioned in such a way that its walls bulge elastically to allow further passage of the slider strip 76. The cams 97 in the slits 88 snap into the narrowed section 81 of the slider strip 76, allowing the elastically bulged U-shaped latch 86 to buckle back into its original shape. The cams 97 and the part of the backbone 79 hooking behind the cams 79 are provided with edges under right angles with the sliding direction of the sliding strip. This way, the slider strip 76 cannot be pulled back out of the U-shaped latch 87 anymore and the latch 87 will not bulge outwardly anymore.

When the slider strip 76 is pushed into the U-shaped latch 87, the ears 96 of the slider lock 38 partly cover the top ends of the side faces of the housing 36 and the openings 75 with the resilient flaps 73 of the clip 37. This way, the risk of unintentional release of the clip 37 is effectively reduced. In this position, shown in cross section perspective view in FIG. 8, the outer ends of the slider strip 76 are in line with the outer end of the U-shaped latch 86.

Figure 9D:
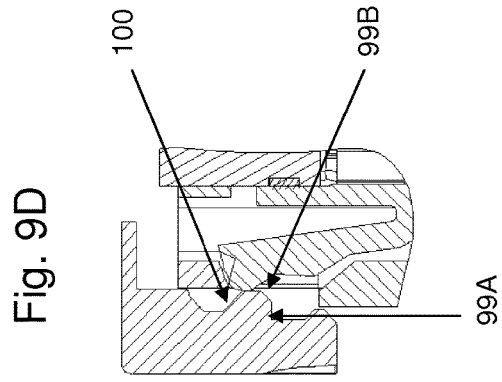
Figure 9E:
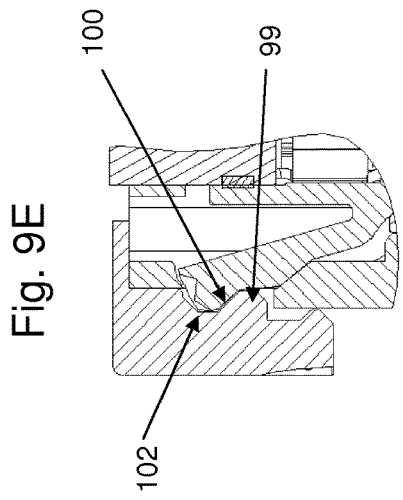
Figure 9A:
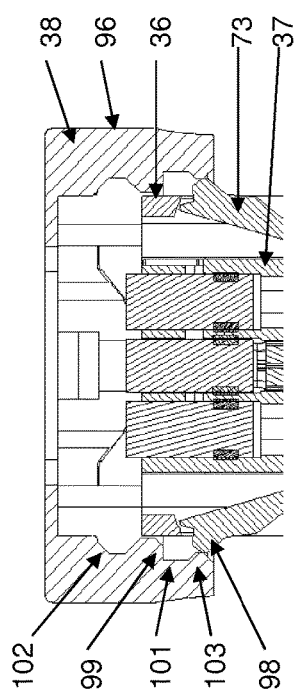
Figure 9B:
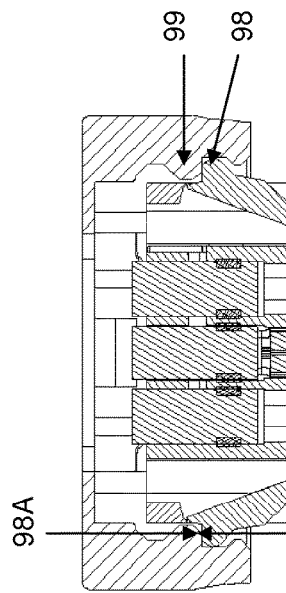

As shown in FIG. 9A-E, the flaps 73 of the clip 37 have top ends with profiled cams 98. Both ears 96 of the slider lock 38 have a set of two indentations separated by a stop 99: a lower indentation 101 and an upper indentation 102. The lower indentation 101 is bordered by a chamfered edge 103. When the slider lock 38 is pushed onto the housing 36 the chamfered edges 103 will push the flaps 73 of the clip 37 inwardly until the cams 98 of the flaps 73 snap into the lower indentation 101 and encounter the stop 99, as shown in FIG. 9B.

The assembly of slider lock 38, clip 37 and housing 36 can then be coupled to the pin header connector 2, as shown in FIGS. 10A-C in consecutive steps. To this end the narrower section 83 of the housing 36 is inserted into the receiving cavity 5 of the pin header connector 2, while the U-shaped latch 86 holding the slider lock 38 is slid into the first section 23 of the recess 22 on the top face of the header connector housing 4. The U-shaped latch 86 snaps over the projection 30 in the recess 22 of the pin header connector 2. If the top face of the projection 30 slants down in the direction of the strip 29, as disclosed above, the projection 30 will pull the U-shaped latch 86 to snap into its final position.

The slider lock 38 effectively extends the housing 36 (see FIG. 10B) and accordingly forms an additional lever for maneuvering the U-shaped latch 86. When the projection 30 snaps behind the bridge 91 of the U-shaped latch 86 a first audible click provides user feedback informing the user that the two connectors 2, 3 are connected and locked. In this position (see FIG. 10B) the mating face of the cable connector encounters the bottom of the receiving cavity 5 of the header housing 4. The slider lock 38 can still be pushed further into the second section 24 of the recess 22 on top of the pin header connector housing 4.

FIG. 9B shows in cross section the slider lock 38 capping the housing 36 in the same stage of assembly as shown in FIG. 10A. At the side of the first indentation 101 the stops 99 have a stop face 99A substantially perpendicular to the assembly direction. The cams 98 have a corresponding stop face 98A, preventing passage of the cams 98 beyond the stop 99.

Figure 9C:
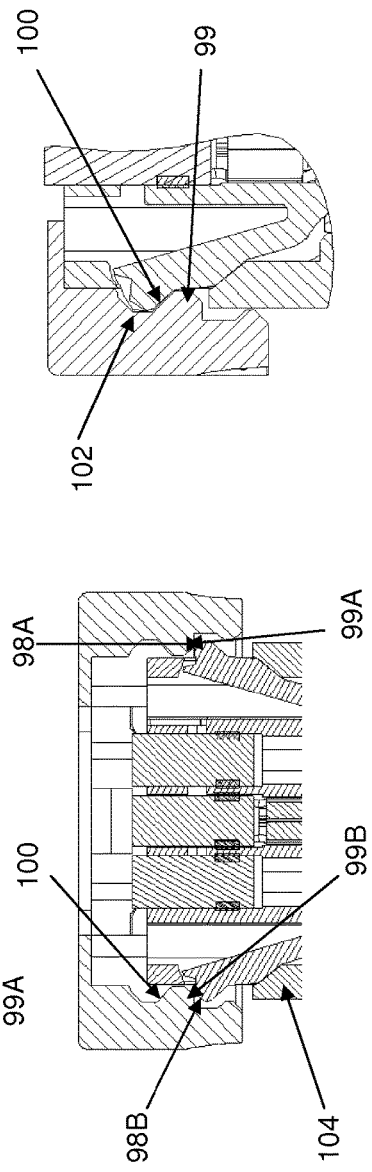

As shown in FIG. 9C, the housing of the pin header connector 2 comprises two inwardly chamfered flanges 104 flanking the receiving opening (see also FIG. 2B). These chamfered flanges 104 engage the flaps 73 of the clip 37 and gradually push the flaps 73 inwardly, until the stop face 98A of the cam 98 does not abut the stop face 99A of the stop 99 anymore. A chamfered edge 98B of the cam 98 now starts abutting a correspondingly chamfered edge 99B of the stop 99, allowing further inward pushing of the flap 73 so the flaps 73 can pass the stop 99. The force needed to push the chamfered edge 98B over the chamfered edge 99B is larger than the sum of the remaining mating forces, which includes friction forces between the pin contacts and the terminal contacts and the force required to drive the latch 86 over the projection 30. This way the slider strip 76 cannot be pushed into the recess 24 before the cable connector 3 is fully mated with the pin header connector 2.

The stop 99 has a sloping face 100. After passing the stop 99 the cam 98 of the flaps 73 snaps into the second indentation 102 (see FIG. 9E), resulting in a second audible click informing the user that the locking of the two connectors 2, 3 is now secured. The sloping face 100 of the stop 99 pulls the flaps 73 and the cable connector 3 upwardly against the top flange 110 of the slider lock 38. As a result, any attempt to unlock the cable connector by pushing on the top flange 110 will fail since it would drive the flaps 73 and the cable connector 3 further into the slider lock 38.

When the cam 98 of the flap 73 is in the second indentation 102 of the slider lock 38, the outer end of the slider strip 76 extends past the outer end of the U-shaped latch 86 into the narrower second section 24 of the recess 22 of the pin header connector 2 (see FIG. 10C). The flaps 73 of the clip 37 are now completely overlapped by the ears 96 of the slider lock 38 and the clip 37 is fully shielded and hidden from view.

In the assembled condition, the top faces of the slider lock 38, the U-shaped latch 86 and the pin header connector housing 4 are all within the same plane. With all latching parts 76, 86 being sunk in corresponding recesses less space is consumed above the circuit board and a very compact build-up is achieved.

As particularly shown in FIG. 11, the tip 106 of the slider lock strip is chamfered. The flanges 26 narrowing the open side of the second section 24 of the recess 22 on the pin header connector housing 4 have contact faces 107 which are chamfered at a corresponding angle. In the final position the chamfered tip 106 will engage the chamfered contact faces 107 and will be pushed down even if the slider lock is slightly tilted during assembly, as shown in FIG. 11.

FIG. 13 shows in cross section the connector assembly 1 of the cable connector 3 with the pin header connector 2. The assembly 1 is similar as the assembly in FIG. 1, with the difference that the pin header connector 2 is held by the hold down members 17 in a vertical position. The slider strip 76 is connected to the top flange 110 with a thickened root section 118 engaging the outer wall of the housing 36 of the cable connector 3. This further fixates the slider lock 38 relative to the housing 36 and prevents any maneuverability of the slider strip 76 by pushing the cable entry side of the slider lock 38.

An alternative embodiment of a connector 3' is shown in FIG. 14. The connector is similar to the connector shown in FIGS. 1-13 with the difference that the spring lips 94' are now part of the slider strip 76'. The slider lock 38' is shown as a separate part in FIG. 15. In FIG. 16 the connector 3' is shown in cross section along line X-X in FIG. 15, which is slightly offset from the center line. The slider strip 76' is slid into the receiving recess 89' to form an integral part of the latch 86'. The latch 86' hinges about an axis indicated in FIG. 14 by line Y-Y. The resilient lips 94' engage the outer wall of the housing and are spring loaded. This way the lips 94' push the rear end of the latch upwardly to tilt down the front end of the latch 86' into its latching position.

Alternatively, the spring element can comprise a single resilient lip, preferably as a centrally positioned part of the slider lock strip 76'.

The invention claimed is:

1. A connector comprising:
   a first housing component comprising a U-shaped latch hingeable about a hinging section, the latch having a latch end at one side of the hinging section and a rear end at an opposite side of the hinging section, and
   a second housing component comprising a plurality of resilient spring elements engaging the rear end to bias the latch end to a latching position, wherein the first housing component comprises a matching cavity for the second housing component.

2. The connector of claim 1, wherein the spring elements include one or more resilient lips.

3. The connector of claim 2, wherein the lips point in a direction substantially opposite to a mating direction.

4. The connector of claim 2, wherein the connector comprises recesses, and wherein the resilient lips protrude through the recesses to engage the rear end of the latch.

5. The connector of claim 1, wherein the latch is at least partly an in-molded integral part of the first housing component.

6. The connector of claim 1, wherein the second housing component comprises a slider lock locking the latch in the latched position when the connector is connected to a complementary second connector, the slider lock comprising a strip received in a recess of the latch to form a backbone, wherein the spring elements are part of the slider lock.

7. The connector of claim 1, wherein:
   the U-shaped latching member comprises two legs joined at the latch end by a bridge, and
   the two legs having opposing ends, joined to the first housing component at the hinging section.

8. The connector assembly of a connector of claim 1, and a complementary connector comprising a latch section engaging the latch end of the latch.

9. The connector assembly of claim 8, wherein:
   the complementary connector comprises a surface having a recess therein,
   the latch section is disposed on the surface, and
   the latch end fits within the recess.

10. A connector comprising a U-shaped latch hingeable about a hinging section, the latch having a latch end at one side of the hinging section and a rear end at an opposite side of the hinging section, wherein the connector comprises a plurality of resilient spring elements engaging the rear end to bias the latch end to a latching position the spring elements include one or more resilient lips, and at least one of the spring elements is part of an insert in a matching cavity of the connector.

11. The connector of claim 10, wherein the connector comprises a receiving opening allowing insertion of the insert into the cavity, wherein the rear end of the latch and the resilient lips point in the direction of the receiving opening.

12. The connector of claim 10, wherein the one or more resilient lips are arranged to allow only one single orientation of the insert within the receiving cavity.

13. A connector comprising a latch hingeable about a hinging section, the latch having a latch end at one side of the hinging section and a rear end at an opposite side of the hinging section, wherein the connector comprises a plurality of resilient spring elements engaging the rear end to bias the latch end to a latching position, wherein the spring elements include one or more resilient lips, wherein at least one of the spring elements is part of an insert in a matching cavity of the connector, wherein the connector comprises a receiving opening allowing insertion of the insert into the cavity, wherein the rear end of the latch and the resilient lips point in the direction of the receiving opening, wherein the connector comprises recesses, and wherein the resilient lips protrude through the recesses to engage the rear end of the latch.

14. The connector of claim 13, wherein the recesses extend from a receiving opening towards the hinging section.

15. A connector comprising a latch hingeable about a hinging section, the latch having a latch end at one side of the hinging section and a rear end at an opposite side of the hinging section, wherein the connector comprises one or more resilient spring elements engaging the rear end to bias the latch end to a latching position, wherein at least one of the spring elements is part of an insert in a matching cavity of the connector, wherein the insert is a clip with cavities holding electroconductive contacts connected to a cable.

16. The connector of claim 15, wherein the contacts are pin receiving terminal contacts, the connector comprising a contact face with one or more openings allowing access to the terminal contacts by matching pin contacts.

17. A connector comprising:
a first housing component comprising a U-shaped latch hingeable about a hinging section, the latch having a latch end at one side of the hinging section and a rear end at an opposite side of the hinging section,
a second housing component comprising a plurality of resilient spring elements engaging the rear end to bias the latch end to a latching position, and
a lock slidably mounted relative to the first housing component so as to slide between an unlocked and a locked position, the lock comprising a strip having a distal end positioned to slide over the latch end when the lock slides from the unlocked to the locked position.

18. The connector of claim 17, wherein:
the latch comprises a first leg and a second leg and a bridge joining the first leg and the second leg, and
the bridge comprises the latching end.

19. The connector of claim 17 comprising one or more resilient spring elements engaging a rear end of the strip such that a forward end of the strip is biased onto the latch such that the latch end is biased toward the first housing component.

* * * * *